(12) United States Patent
Burn et al.

(10) Patent No.: US 9,187,609 B2
(45) Date of Patent: Nov. 17, 2015

(54) SYSTEM FOR COVERING HYDROCARBON LIQUIDS AND METHOD OF FORMING SAME

(71) Applicant: Greatario Industrial Storage Systems Ltd., Innerkip (CA)

(72) Inventors: J. Scott Burn, Innerkip (CA); Terrance J. Frank, Carlisle (CA); Steven A. Coppa, Toronto (CA)

(73) Assignee: Greatario Industrial Storage Systems Ltd., Innerkip, Ontario ( * ) Notice: Subject to any disclaimer, the term of this patent is extended or adjusted under 35 U.S.C. 154(b) by 64 days.

(21) Appl. No.: 14/044,537

(22) Filed: Oct. 2, 2013

(65) Prior Publication Data
US 2015/0094391 A1 Apr. 2, 2015

(51) Int. Cl.
*C08J 9/00* (2006.01)
*B65D 88/36* (2006.01)

(52) U.S. Cl.
CPC .................. *C08J 9/009* (2013.01); *B65D 88/36* (2013.01); *C08J 2201/022* (2013.01)

(58) Field of Classification Search
CPC ...... B65D 88/36; C08J 9/009; C08J 2201/022
See application file for complete search history.

(56) References Cited

U.S. PATENT DOCUMENTS

| | | | | |
|---|---|---|---|---|
| 3,819,780 A | * | 6/1974 | Anderson et al. | 264/45.2 |
| 3,938,338 A | | 2/1976 | Cullen | |
| 3,993,214 A | * | 11/1976 | Usab | 220/218 |
| 5,207,964 A | * | 5/1993 | Mauro | 264/221 |
| 8,099,804 B2 | * | 1/2012 | Gregg | 4/498 |
| 8,342,352 B2 | | 1/2013 | Alirol | |
| 2007/0155858 A1 | * | 7/2007 | Israelson | 523/214 |

FOREIGN PATENT DOCUMENTS

| | | |
|---|---|---|
| CA | 2797761 C | 6/2014 |
| EP | 1697234 B1 | 1/2012 |

* cited by examiner

*Primary Examiner* — Irina S Zemel

(57) ABSTRACT

A method of forming an element to float at least partially on a surface of an at least partially liquid hydrocarbon mixture. The method includes mixing a polymer resin and a foaming agent together in preselected proportions to provide a material mixture, and heating the material mixture, to at least partially liquefy it. The material mixture is injected into a mold cavity configured to define the element's exterior surface in a series of at least three steps, commencing with an initial step. In each step, the material mixture is injected over a predetermined time period at a predetermined velocity and under a predetermined pressure. Each predetermined velocity in the steps following the initial step is less than the predetermined velocity in an immediately preceding step thereof. Each predetermined pressure in the steps following the initial step is less than the predetermined pressure in the immediately preceding step thereof.

20 Claims, 17 Drawing Sheets

SYSTEM FOR COVERING HYDROCARBON LIQUIDS AND METHOD OF FORMING SAME

FIELD OF THE INVENTION

The present invention is a system for covering hydrocarbon liquids and a method of forming the system.

BACKGROUND OF THE INVENTION

As is well known in the art, oil field collection tanks are used as loading points for oil collected from conventional heavy and mid to light crude oil wells. The field collection tanks allow the operator to have a mixture including crude oil (as hereinafter described) flow from the subsurface formation, via the well, to the Earth's surface (i.e., the collection tanks) at a natural flow rate, or at a pump-assisted flow rate. The mixture accumulates in the tank until sufficient volume is in the tank to trigger level instrumentation inside the tank, which then signals that the volume of accumulated crude oil has reached a predetermined level. Typically, a tanker is then sent to the site in response to the signal to remove the accumulated crude oil from the collection tank. The oil is transported by the tanker to larger storage tanks, where it is stored until processed.

Typically, the crude oil accumulates in the collection tank over an extended period of time, e.g., several days, before a volume sufficient to cause the signals to be sent that request the tanker to remove crude oil from the collection tank.

The mixture that flows from the subsurface formation usually includes water and sediment. ("Sediment" herein refers to all foreign (non-crude oil) material other than water in the mixture.) Where the crude oil is heavy crude oil, it is desirable that the mixture that accumulates in the collection tank be treated (i.e., "conditioned") while it is in the collection tank, to separate at least part of the water and sediment from the crude oil. Such separation permits more efficient processing of the crude oil subsequently.

The treatment, or conditioning, involves maintaining the crude oil at an elevated temperature (e.g., approximately 80° C.). Due to such conditioning, over a relatively short time period, the water and sediment separate from the heavy crude oil, and stratify, i.e., they also substantially separate from each other. As is known in the art, the heat facilitates the separation of the heavy crude oil, the water, and the sediment, under the influence of gravity. The heat reduces the viscosity of the heavy crude oil sufficiently to permit the sediment to separate from the crude oil, under the influence of gravity. The separation of the crude oil from the water and sediment typically begins upon introduction of the mixture into the container. However, in order for the separation (i.e., the conditioning) to be substantially completed, it appears that the mixture needs to reach a temperature of approximately 80° C.

FIG. 1A is a cross-section of a collection tank 10 of the prior art showing, for purposes of illustration, a mixture 12, i.e., prior to conditioning thereof. In FIG. 1B, the results of the conditioning are shown. (As will be described, the remainder of the drawings illustrate the present invention.) Due to the conditioning, the mixture 12 shown in FIG. 1A has separated into heavy crude oil 14 positioned above water 16 and sediment 18. Those skilled in the art would appreciate that the mixture as shown in FIG. 1A, and the stratification of the mixture as shown in FIG. 1B, are somewhat simplified for the purposes of illustration. In FIG. 1A, a surface 19 of the mixture 12 is identified. In FIG. 1B, a surface of the heavy crude oil 14 is identified by reference numeral 19' for clarity.

Because of the conditioning, the water and sediment are generally separated from the heavy crude oil in the collection tank. Having a density of about 0.92 g/cc (57.4 lbs./cu. ft.), the heavy crude oil is less dense than the water and the sediment. Accordingly, once the mixture has been conditioned, the water and the sediment are separated, and positioned below the heavy crude oil so that the tanker can remove only the "conditioned" crude portion to the processing facility (FIG. 1B). As is well known in the art, after the heavy crude oil is removed, the accumulated water and sediment are removed separately.

In practice, where an oil well produces crude oil at a relatively rapid rate, the mixture may not be allowed to remain in the container long enough to reach the desired conditioning temperature of 80° C. In this situation, due to the relatively small capacity of the container in view of the well's production rate, the crude oil is removed from the container of necessity, however, the removal may take place before the preferred temperature of 80° C. is achieved. One consequence of this is that the viscosity of the crude oil is relatively high while it is in the container, and for this reason, smaller pieces of sediment remain trapped in the crude oil. That is, if the mixture doesn't remain in the container long enough to reach 80° C., the conditioning is not completed. These trapped impurities ultimately result in higher processing costs.

Existing field collection tank designs typically include thermal insulation on the outside of the tank and a source of heat (e.g., a gas-fired direct burner heater) (not shown in FIGS. 1A and 1B) mounted on the field tank to maintain the mixture's temperature at, or close to, the ideal temperature of approximately 80° C. which is required for oil conditioning during accumulation. However, because the desired temperature is elevated, heat is lost from the mixture to the surroundings. Accordingly, one disadvantage of the prior art is that the heat loss results in increased operational costs, due to energy inputs required for additional heat, to replace the heat lost to the surroundings.

As noted above, another disadvantage of the prior art is that, when the crude oil production rate requires that the container be emptied relatively frequently, the mixture is not properly heated (i.e., to 80° C.) before the heavy crude oil is removed.

Much of the heat loss from the mixture is from the surface thereof, partially (but not entirely) due to vapours escaping therefrom. The vapours contain many light hydrocarbon compounds, generally known in the industry as BTEX. These vapours contain carcinogens and therefore pose a health risk. Also, their escape from the collection tank is a vehicle for the loss of a great deal of thermal energy. As is well known in the art, the collection tanks are not pressure vessels and are vented to the atmosphere, to allow the liquid level to change without causing a pressure or vacuum condition to occur. In FIGS. 1A and 1B, vapours and thermal energy escape from the collection tank via the headspace "H" as schematically indicated by arrow "A". Accordingly, the escape of such vapours from the container is another disadvantage of the prior art.

Depending upon the oil well, there may be natural gas and other vapours that percolate up in the mixture in the collection tank, and these gases can cause the mixture (or, after separation, the heavy crude oil) to froth. This oil froth or foam, which can become relatively thick in elevation above the actual liquid surface, can cause the liquid level instrumentation to generate a false high level indication and prematurely shut down the oil well pump prior to the field tank actually being full. To prevent this, current practice is to employ chemical surfactant additives via dosing systems at each of the well locations, to administer the chemical surfactants into the flow of the mixture that will reduce frothing inside the storage tanks. However, the chemical surfactants also contain BTEX and carcinogenic chemicals that are undesirable, and consequently put operators at risk.

Also, the chemical surfactant additives, by their nature, reduce the heat transfer efficiency of any thermal equipment that comes into contact with the heavy crude oil, thereby making heat transfer processes less energy efficient. That is, because surfactants reduce surface tension, their use tends to result in more laminar flow, i.e., correspondingly less turbulent flow. Because energy transfer to the liquid is more efficient where the liquid is subject to turbulent flow, the use of surfactants generally tends to result in less efficient transfers of energy, e.g., heat energy. Accordingly, elimination of the chemical surfactant additives would be advantageous, because it would save costs, increase thermal efficiency and eliminate certain health risks to operators.

Floating segmented covers are known that typically are made from recycled polypropylene/high-density polyethylene (HDPE) or polyethylene (PE) that is chemically foamed to a specific gravity of at least 0.5 (i.e., a density of not less than 0.5 g/cc (approximately 31.2 lbs./cu. ft.)). This density is due to the nature of the material and technical and processing limitations, as is known in the art. These covers are made of several cover components and are only intended for water and wastewater applications, where the specific gravity of the fluid covered is approximately 1.0. With a specific gravity of 0.5 (i.e., a density of approximately 0.5 g/cc (approximately 31.2 lbs./cu. ft.)) these prior art cover components initially can float on the surface of an aqueous liquid with the liquid waterline positioned substantially at the center of the cover component. For instance, the wastewater may include manure, and the cover is intended to impede and obstruct the release of noxious odours and potentially harmful vapours from the wastewater.

However, it has been found that, over time, the prior art cover components absorb and/or adsorb water into the cellular structure of the foamed polymer. They therefore become heavier (i.e., more dense) over time. When the specific gravity of the cover component is greater than 0.5 (i.e., a density of 0.5 g/cc (approximately 31.2 lbs./cu. ft.)), the liquid level is above the vertical center of the cover component, i.e., allowing liquid to be above at least part of the cover component. At that point, the cover components are no longer covering the surface of the wastewater, and the odours and vapours escape from the wastewater. It can be seen, therefore, that the prior art foamed polypropylene, HDPE, or PE cover components are effective for only a limited period of time when they are used on water.

The prior art foamed polypropylene covers have been tested in the heated (or "conditioned") mixture of heavy crude oil, water, and sediment described above. Such prior art covers have been found to be unsatisfactory in this context, for a number of reasons. In particular, the prior art covers tend to sink within a relatively short time after being positioned on the heated mixture. Based on the testing done to date, it appears that there are at least three distinct reasons why the prior art covers do not function properly when positioned in and on the mixture in the collection tank.

First, the density of the prior art cover components is too high. The a hydrocarbon liquid mixture typically has a specific gravity of about 0.8-0.9 (i.e., a density of about 0.8-0.9 g/cc (approximately 49.9-56.2 lbs./cu. ft.)). In order for the cover component to be less than about 50 percent submerged initially, the prior art cover component would need a specific gravity less than about 0.5 (i.e., a density of less than about 0.5 g/cc (approximately 31.2 lbs./cu. ft.)). Accordingly, the prior art cover components tend to sink when positioned on the mixture. Due to the configuration of the cover components (i.e., generally wider in the middle), when the cover component is more than about 50 percent submerged, the mixture is on top of at least part of the cover component, and the cover components do not substantially cover the surface.

Second, it is believed that the heavy crude oil is relatively quickly absorbed and/or adsorbed into the foamed cellular structure of the prior art cover components. The prior art chemically foamed polymer cover components, made of polypropylene or polyethylene (as described above), appear to allow the diffusion of hydrocarbons and water through the cellular structure of the polymer wall thereof relatively quickly. This causes the prior art cover component to gain weight relatively quickly and sink further into the liquid, quickly rendering it largely submerged and ineffective.

Third, the prior art foamed polypropylene, HDPE, and PE cover components are not chemically compatible with the hydrocarbons, i.e., these materials are soluble in hydrocarbons. In particular, the elevated operating temperatures encountered in the crude oil collection tanks tend to accelerate the polypropylene, HDPE, and PE degradation.

SUMMARY OF THE INVENTION

For the foregoing reasons, there is a need for a system and a method that overcome or mitigate one or more of the deficiencies of the prior art.

In its broad aspect, the invention provides a method of forming an element to float at least partially on a surface of an at least partially liquid hydrocarbon mixture. The method includes mixing a polymer resin and a foaming agent together in preselected proportions to provide a material mixture, and heating the material mixture, to at least partially liquefy the material mixture. The at least partially liquefied material mixture is injected into a mold cavity configured to define the element's exterior surface over a predetermined first time period at a predetermined first velocity and under a predetermined first pressure. At the end of the first predetermined time period, the at least partially liquefied material mixture is injected into the mold cavity over a predetermined second time period at a predetermined second velocity that is less than the first velocity, and under a predetermined second pressure that is less than the first pressure. At the end of the second predetermined time period, the at least partially liquefied material mixture is injected into the mold cavity over a predetermined third time period at a predetermined third velocity that is less than the second velocity, and under a third pressure that is less than the second pressure.

In another of its aspects, the invention provides one or more elements formed according to the method of the invention.

In yet another aspect, the invention provides a system including a number of the elements formed according to the method of the invention. The elements are engaged or engageable with each other to substantially cover the surface of the hydrocarbon mixture, for impeding transfer of thermal energy and emission of vapours from the mixture via the surface.

In another of its aspects, the invention provides a method of forming an element to float at least partially on a surface of an at least partially liquid hydrocarbon mixture. The method includes mixing a preselected polymer resin having a melt flow index of at least approximately 15, and a preselected foaming agent together in preselected proportions to provide a material mixture, and heating the material mixture, to at least partially liquefy the material mixture. The at least partially liquefied material mixture is injected in three temporally consecutive steps, in which the at least partially liquefied material mixture is injected into a mold cavity configured to define the element at a first velocity under a first pressure during a first step, the at least partially liquefied material mixture is injected into the mold cavity at a second velocity that is approximately 50 percent of the first velocity under a second pressure that is approximately 48 percent of the first pressure during a second step, and the at least partially liquefied material mixture is injected into the mold cavity at a third velocity that is approximately 50 percent of the second velocity, and under a third pressure that is approximately 75 percent of the second pressure during a third step.

In yet another of its aspects, the invention provides a method of forming an element to float at least partially on a surface of an at least partially liquid hydrocarbon mixture. The method includes mixing a polymer resin and a foaming agent together in preselected proportions to provide a material mixture, and heating the material mixture, to at least partially liquefy the material mixture. The at least partially liquefied material mixture is injected into a mold cavity configured to define the element's exterior surface in a series of at least three steps commencing with an initial one of the at least three steps. In each of the at least three steps the material mixture is injected over a predetermined time period at a predetermined velocity and under a predetermined pressure. Each predetermined velocity in the steps following the initial one of the at least three steps is less than the predetermined velocity in an immediately preceding step thereof. Each predetermined pressure in the steps following the initial one of the at least three steps is less than the predetermined pressure in the immediately preceding step thereof.

BRIEF DESCRIPTION OF THE DRAWINGS

The invention will be better understood with reference to the attached drawings, in which.

DETAILED DESCRIPTION

Figure 1A:
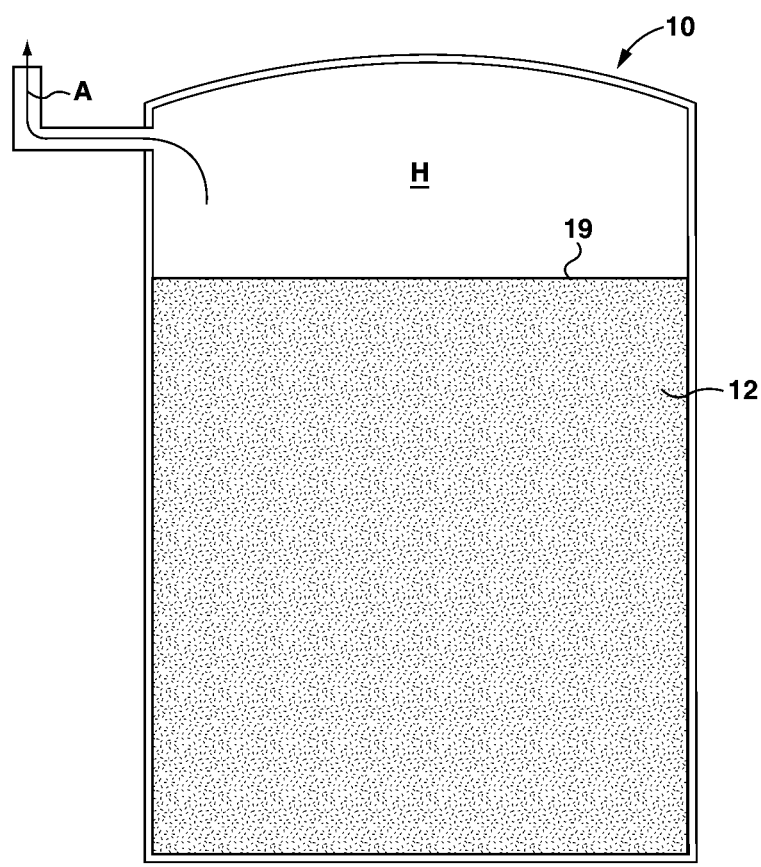
FIG. 1A (also described previously) is a cross-section of a prior art crude oil collection tank in which a mixture of crude oil, water, and sediment is positioned.
Figure 1B:
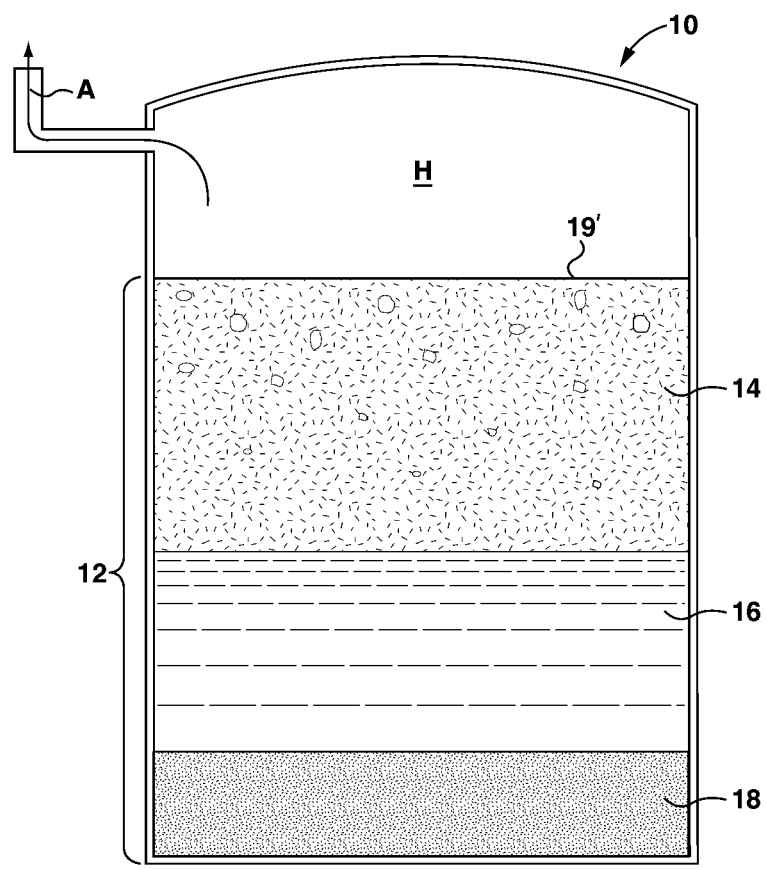
FIG. 1B (also described previously) is a cross-section of the oil collection tank of FIG. 1A in which the mixture has been substantially separated into layers of heavy crude oil, water, and sediment.

In the attached drawings, like reference numerals designate corresponding elements throughout. Also, to simplify the description, the reference numerals used in FIGS. 1A and 1B, in connection with describing the prior art, are increased by 100 and used in connection with describing the invention hereinafter, where elements correspond to elements already described. Reference is first made to FIGS. 2A-6 and 8A-8B to describe an embodiment of a system in accordance with the invention indicated generally by the numeral 120 (FIG. 2B). Preferably, the system 120 is for substantially covering a surface 119 of a mixture 112 including heavy crude oil 114 in a container 110 (FIGS. 2B, 4). In one embodiment, the system 120 preferably includes a number of elements 122, as will be described.

For convenience, the mixture 112 is illustrated in FIG. 2B as having been conditioned. It will be understood that, as discussed above, when first introduced into the container 110, the mixture 112 is not conditioned.

As can be seen in FIGS. 2B and 4, the elements 122 preferably are formed to at least partially float on the mixture 112. Each element 122 preferably includes a body 124. The sizes of these elements 122 are designed specifically relative to the size of the liquid vessel 110 in which they will operate, so that there is a minimum of excess area of the liquid surface 119 that is not covered. It will be understood that, in FIG. 4, the extent of the excess area (identified as "EA" in FIG. 4) is shown as being larger than it preferably would be in practice, for clarity of illustration.

Those skilled in the art would appreciate that the body 124 may have any suitable structure. It is preferred that all of the elements 122 have substantially the same size and shape. Preferably, and as will be described, each of the elements is symmetrical. The symmetrical shape of the elements 122 as illustrated allows them to be randomly deployed into the liquid container 110.

It would also be appreciated by those skilled in the art that the elements 122 may be introduced into the container 110 when the mixture is in the container, or, alternatively, when the container is empty, or substantially empty.

If the elements 122 are deployed when the container 110 contains the mixture 112, then immediately after the elements 122 are deployed into the container 110 onto the mixture 112, they slip off of each other and automatically form an organized single unit, engaged with each other at their respective outer edges, at their lowest gravimetrical energy state. Preferably, the elements 122 are sized so that, when on the surface 119 of the mixture 112, they form a substantially continuous cover 120 extending over substantially the entire surface 119, i.e., with very little exposed area of the surface. As illustrated in FIGS. 2B, 2C and 4, the elements 122 around the perimeter of the surface preferably engage the interior surface 126 of a wall 128 of the container 110.

If the elements 122 are deployed into a container that is empty or substantially empty, then the elements 122 are piled on the floor of the container 110 until the mixture 112 is introduced into the container 110. Due to the rising level of the mixture 112 in the container 110, when the elements 122 begin to float on the mixture 112, the elements 122 slip off each other so that they are all in and on the mixture, and their outer edges engage each other, to form the cover 120 extending over substantially the entire surface.

Figure 2A:
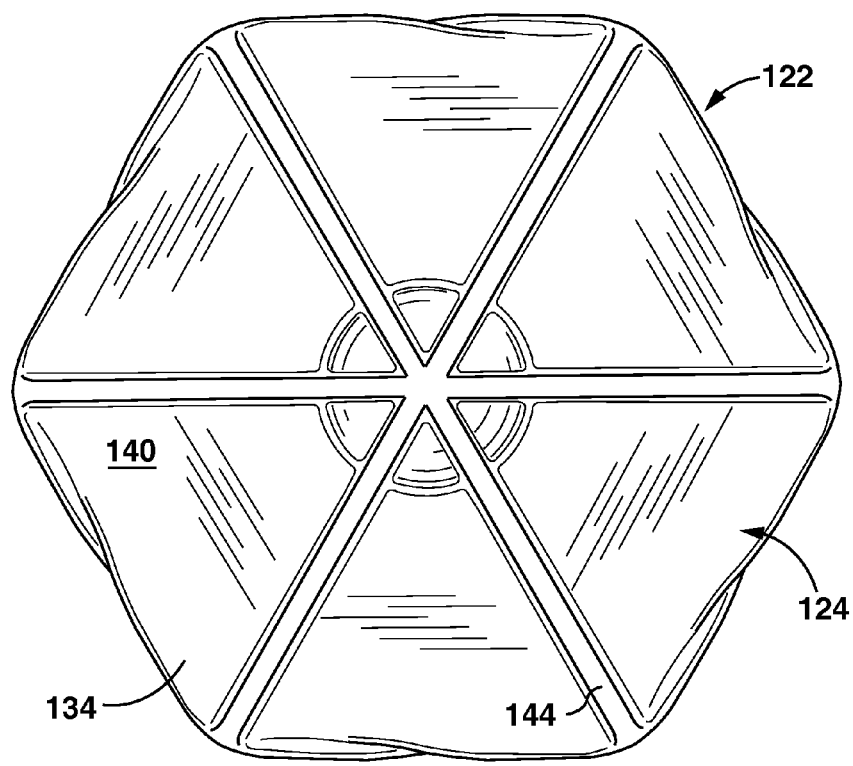
FIG. 2A is a top view of an embodiment of an element of the invention, drawn at a larger scale.
Figure 3A:
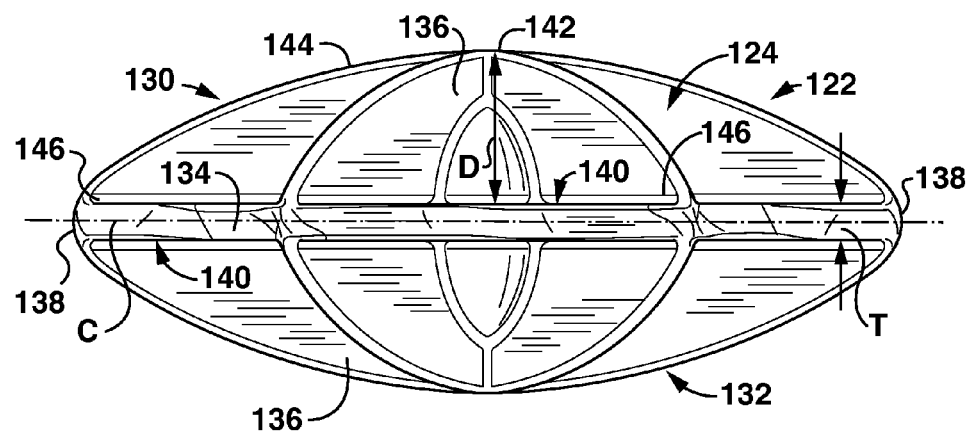
FIG. 3A is a side view of the element of FIG. 2A, drawn at a larger scale.
Figure 2B:
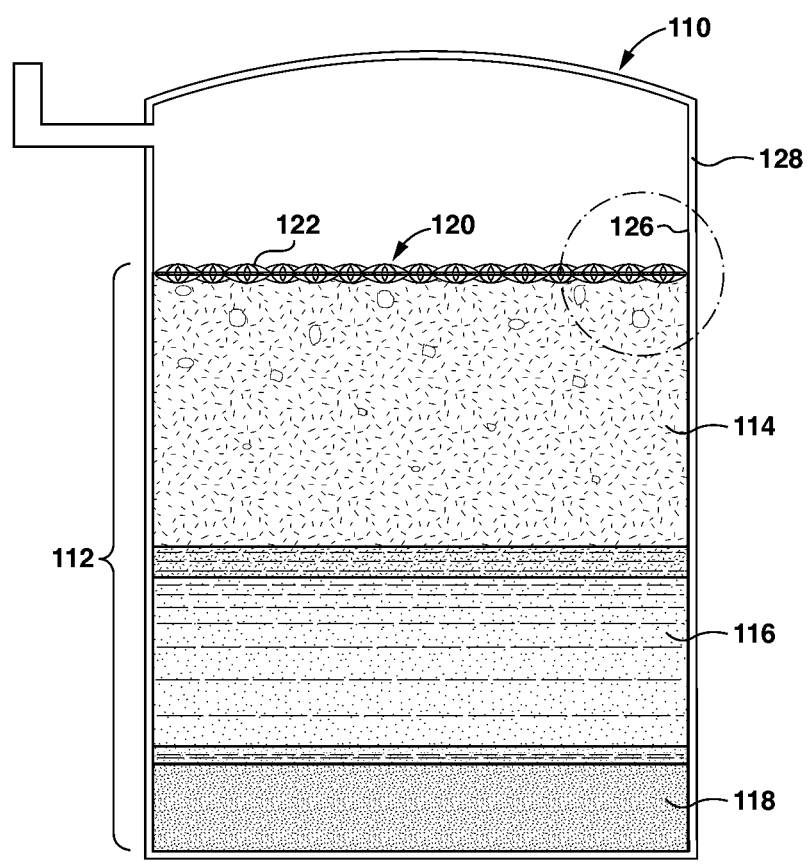
FIG. 2B is a cross-section showing an embodiment of the system of the invention positioned on a surface of the mixture in the tank, drawn at a smaller scale.
Figure 2C:
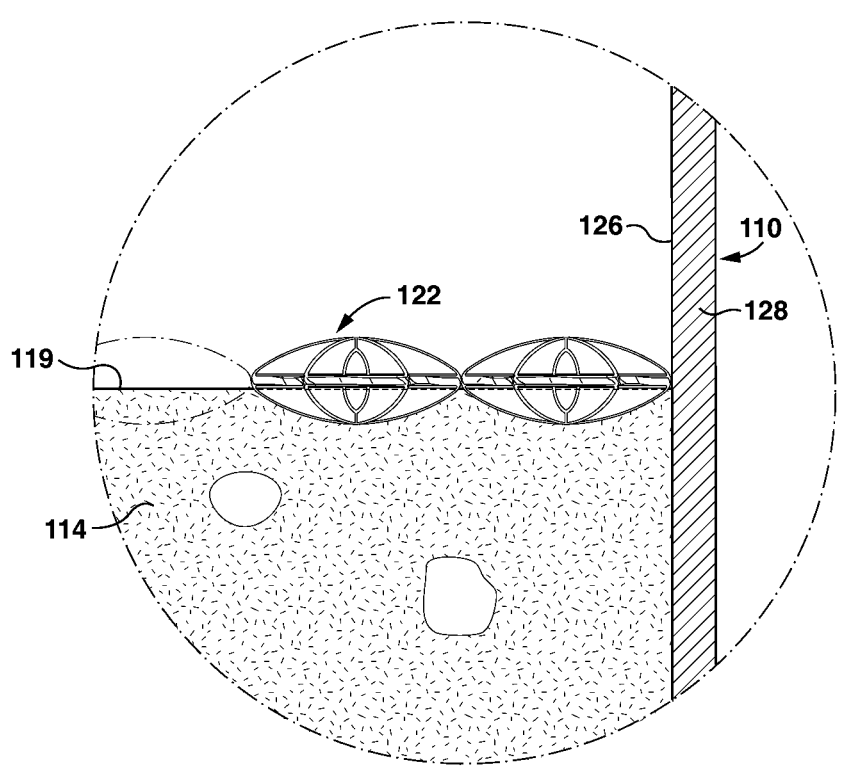
FIG. 2C is a portion of the cross-section of FIG. 2B, drawn at a larger scale.

As can be seen in FIGS. 2A, 3A, 3B, and 5, the element of the invention preferably is in the form of a hexagon, in plan view. The body 124 preferably has first and second sides 130, 132 and a central plate 134 therebetween (FIG. 3A). As can be seen in FIG. 3A, it is preferred that the first and second sides 130, 132 are substantially symmetrical relatively to a central plane "C" centrally located in the central plate 134. For the purposes hereof, the side of the deployed element that is held substantially at or below the surface 119 is referred to as the "submerged" side, and the other side (i.e., held substantially above the surface 119) is referred to as the "exposed" side. It will be understood that either the first or the second side may be the submerged side, or the exposed side, as the case may be. Due to the generally hexagonal shape of each element 122, a number of the elements 122 can be engaged with each other to form the system 120, providing a substantially continuous cover on the surface 119 of the hydrocarbon mixture (FIG. 4). However, those skilled in the art would appreciate that the elements 122 as illustrated in the enclosed drawings are exemplary only. It will be understood that the elements 122 may have any suitable configuration.

It is preferred that each of the first and second sides 130, 132 includes one or more ridges 136 that are curved, as will be described. As can be seen in FIG. 2A, the central plate 134 preferably includes an outer edge 138 that is engageable with the outer edges of other elements, to form the system. The curved ridges 136 enable the elements 122 to slide off each other, as noted above, to form the cover (i.e., the system 120) in which the elements 122 engage each other at their outer edges 138 (FIG. 4).

In one embodiment, the central plate 134 preferably also includes substantially planar portions 140 thereof, located between the ridges 136 respectively. As can be seen in FIG. 3A, in one embodiment, each of the ridges 136 preferably extends a predetermined distance "D" at an inner end 142 of the ridge 136 substantially orthogonally relative to the planar portion 140.

In one embodiment, it is preferred that the exterior of each of the ridges 136 is defined by a tapered edge 144. Each of the ridges 136 preferably is curved and tapered, so that the tapered edge 144 extends from the inner end 142 of the ridge 136 to an outer end 146 of the ridge 136, at which the tapered edge 144 meets the outer edge 138. Those skilled in the art would appreciate that the tapered edges 144 may have any suitable configuration. As can be seen, for instance, in FIG. 3A, each of the tapered edges 144 preferably defines an arc. Due to the ridges 136, the elements 122 tend not to become hung up on each other when they are first positioned in and on the mixture 112 in the container 110.

In use, the elements 122 preferably are put inside the container 110, to form the system 120. From the foregoing, it can be seen that a sufficient number of the elements 122 preferably is used to substantially cover the surface 119 of the mixture 112. As described above, the elements preferably are sized for the container 110, so as to minimize the exposed area of the surface 119. Those skilled in the art would appreciate that the element may have any suitable dimensions.

There are various factors to be considered in determining the size of the element. For example, for a given surface area of the mixture 112, a smaller-sized element would result in a smaller portion (area) of the surface not being covered once the system is in position, floating at least partially in the mixture. Balanced against this are other factors, for instance, if a larger-sized element is used, fewer elements are required to be handled.

In one embodiment, for example, it has been found that the element 122 is suitably sized for a number of applications if it weighs approximately 286 grams (approximately 0.63 lbs.), and measures approximately 8 inches (approximately 20.3 cm) along each ridge thereof and approximately 3.125 inches (approximately 7.9 cm) in height.

From the foregoing description, it can be also seen that the elements 122 preferably are configured to arrange themselves under the influence of gravity, engaging each other at their respective outer edges 138 into a substantially continuous cover or layer 120 which floats, semi-submerged, on the surface 119. Preferably, a sufficient number of the elements 122 is introduced into the container 110 to cover the entire surface 119 (or substantially the entire surface 119, as the case may be), so that the elements 122 pressing against and engaging the interior surface 126 of the wall 128 push against other elements 122 on the surface 119, to minimize gaps between the elements 122 over the entire surface 119 (FIGS. 2B, 2C, and 4). Those skilled in the art would appreciate that, to the extent that there are gaps between the deployed elements 122, the effectiveness of the cover is compromised.

Figure 3B:
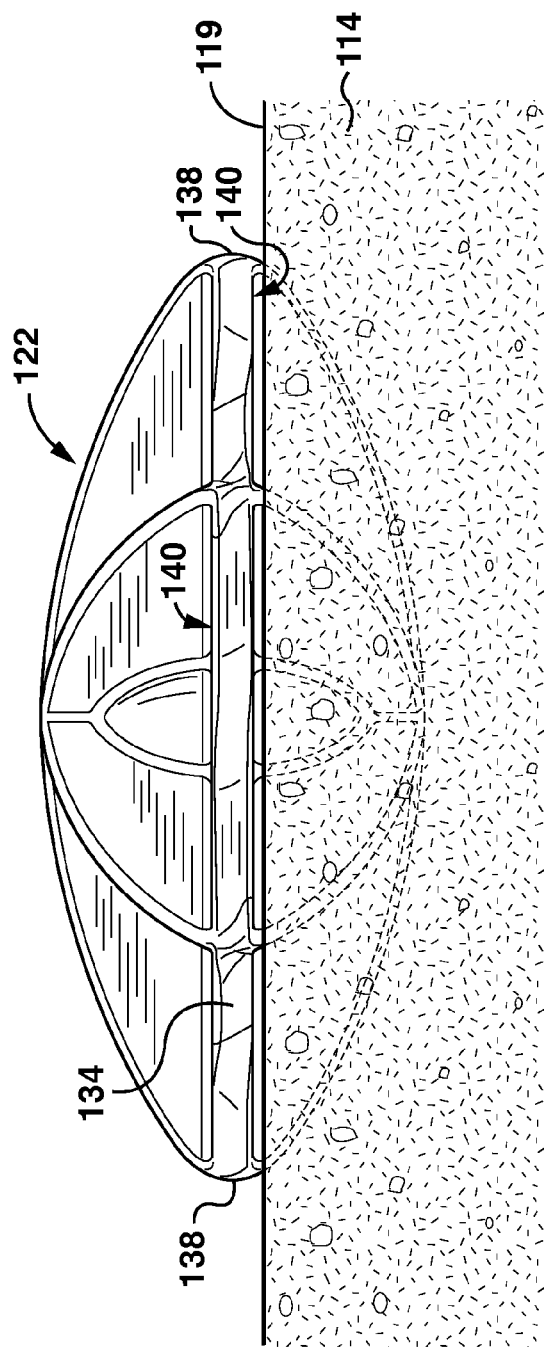
FIG. 3B is a side view of the element of FIG. 2A floating on the surface of the mixture.
Figure 4:
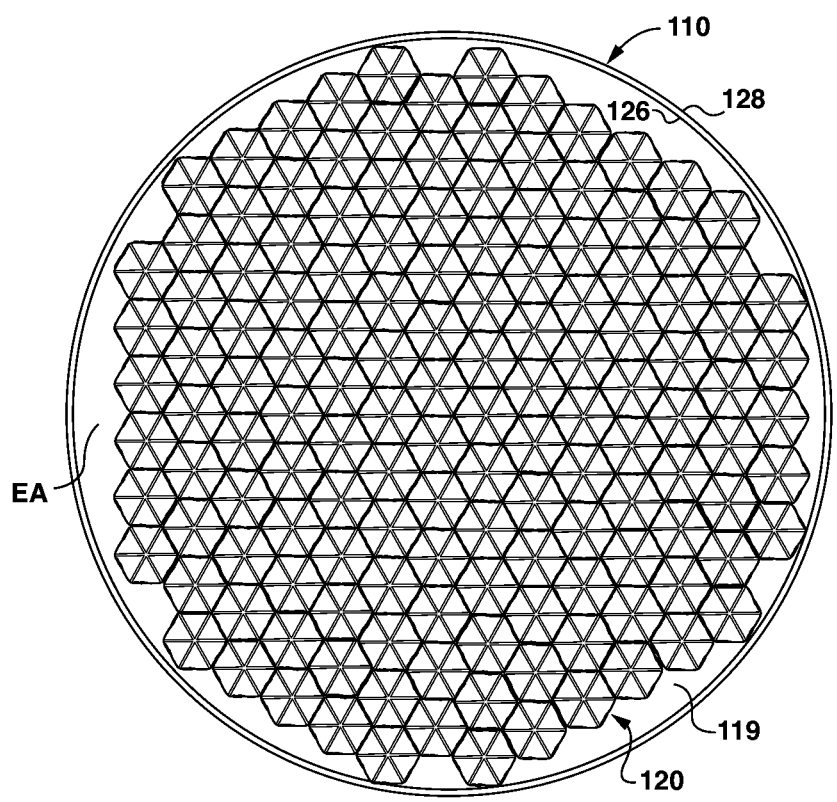
FIG. 4 is a top view of an embodiment of a system of the invention floating on the surface of the mixture in the tank, drawn at a smaller scale.

As described above, the buoyancy of the elements 122 preferably is such that the central plate 134, at least initially, rides on the surface 119 of the mixture 112, or is slightly above the surface 119 (FIG. 3B). It is also preferred that the central plate 134 has a thickness (identified as "T" in FIG. 3A) that is sufficient for buoyancy, even if water or hydrocarbons are absorbed/adsorbed into the polyamide, as will be described.

Figure 5:
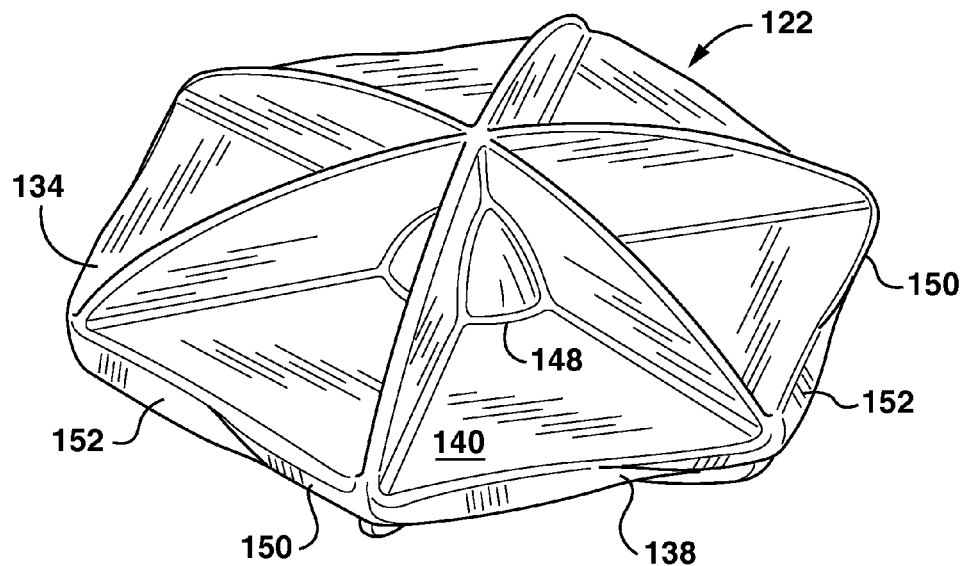
FIG. 5 is an isometric view of the element of FIG. 2A, drawn at a larger scale.

Preferably, the central plate 134 is thicker at an inner edge 148 thereof than at the outer edge 138 thereof (FIG. 5). Accordingly, each of the planar portions 140 of the central plate 134 preferably is tapered from the inner edge 148 to the outer edge 138. Because of this, heavy crude oil that is splashed or otherwise moved onto the exposed (i.e., upper) side of the element 122, e.g., during deployment, is drained off the central plate 134. Those skilled in the art would appreciate that the central plate 134 may be formed having any suitable thicknesses. For instance, in one embodiment, the thickness of the central plate 134 at its inner edge 148 preferably is approximately 1.5 cm (0.59 inch), and the thickness of the central plate 134 at the outer edge 138 is approximately 1.1 cm (0.43 inch).

From the foregoing, those skilled in the art would appreciate that the elements 122 preferably are formed so that they each have a density (i.e., a specific gravity) that enables the element to float. Specifically, it is preferred that the density of the element 122 preferably enables the element 122 to at least partially float on the surface 119, as illustrated in FIG. 3B. As will be described, the position of the element relative to the surface, when the element is floating in and on the mixture 112, is important because the floating elements 122 engage each other to form the system 120, preferably with the least area of the surface 119 being left exposed.

It will be understood that the semi-submerged position of the element 122 on the surface 119 is important because it enables the element's central plate 134 to extend on, or over, the surface 119. Those skilled in the art would appreciate that, when the central plates 134 of the elements 122 are floating semi-submerged (as illustrated for one element in FIG. 3B), and when the elements engage each other at their outer edges, the surface 119 is substantially covered by the system 120 they form (FIGS. 2B, 2C). In this way, the system 120 preferably impedes, obstructs, or substantially prevents heat and harmful vapours or gases from escaping from the mixture 112 and/or the heavy crude oil 114 via the surface 119.

As noted above, the heavy crude oil typically has a density of about 0.92 g/cc (57.4 lbs./cu. ft.). Because the density of the element is between about 0.42 g/cc (approximately 26.2 lbs./cu. ft.) and about 0.46 g/cc (approximately 28.7 lbs./cu. ft.), when the element 122 is floating in and on the mixture (and/or the crude oil thereof), the surface of the mixture is substantially at the midpoint of the elevation of the floating element (FIG. 3B).

As is also noted above, it is preferred that the central plate 134 has a thickness of about 1.1 cm (0.43 inch) at its outer edge. It has been found that this thickness is sufficient to accommodate variations in the liquid density of about 0.8 g/cc (approximately 49.9 lbs./cu. ft.) to about 0.9 g/cc (approximately 56.2 lbs./cu. ft.). As will be described, it is anticipated that, once the element is deployed, the heavy crude oil is slowly adsorbed and/or absorbed into the element. Minor amounts of weight gain by adsorption and/or absorption can also be accommodated by the generous center plate thickness.

Those skilled in the art would appreciate that the density of the mixture 112 when it is first introduced into the container 110 is variable. As noted above, the heavy crude oil may have a density of approximately 0.92 g/cc (approximately 57.4 lbs./cu. ft.). The density of the water portion is approximately 1 g/cc (approximately 62.4 lbs./cu. ft.), and the density of the sediment is much higher. However, it will be understood that the mixture 112 begins to separate into its three main parts (i.e., heavy crude oil, water, and sediment) when it is first introduced into the container 110, and subjected to heat. Accordingly, as a practical matter, the liquid in and on which the element 122 floats substantially has the density of heavy crude oil, i.e., approximately 0.92 g/cc (approximately 57.4 lbs./cu. ft.).

As can be seen in FIGS. 2A, 3A, and 5, in one embodiment, it is preferred that the outer edge 138 of each element 122 includes scallops 150, 152 formed to cooperate with complementary scallops on the outer edges of other elements 122. Those skilled in the art would appreciate that the scallops 150, 152 provide a positive connection between two adjacent deployed elements.

Figure 7:
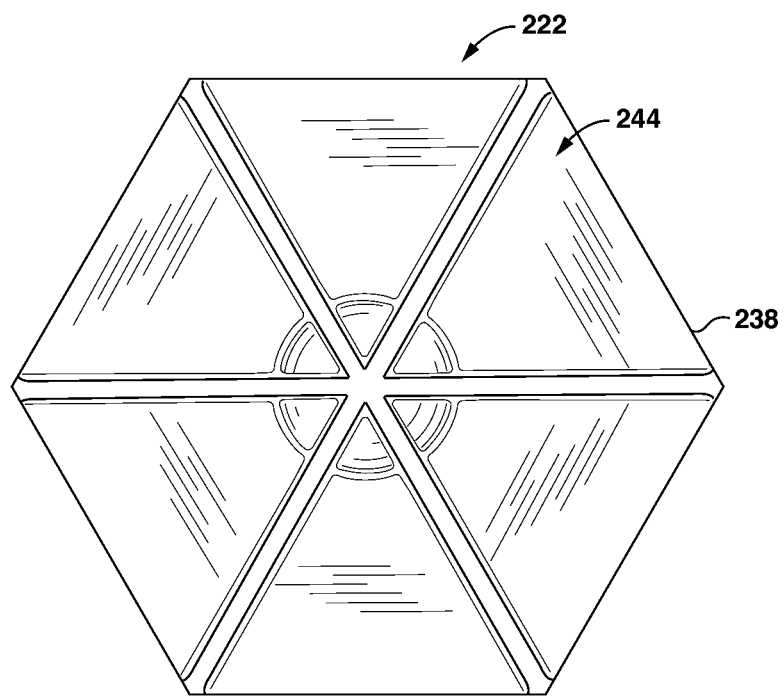
FIG. 7 is a plan view of an alternative embodiment of the element of the invention, drawn at a smaller scale.

An alternative embodiment of an element 222 of the invention is shown in FIG. 7. In this element, a central plate 244 thereof has outer edges 238 that are substantially straight, i.e., planar, and positioned substantially vertical when the central plate is substantially horizontal.

From the foregoing, it can be seen that the system 120 provides a covering over the mixture 112 that substantially impedes or delays the dissipation of heat from the mixture via the surface 119 thereof. In part, this is due to the insulative effect of the elements 122 that comprise the system 120, impeding radiation of heat from the surface. Also, the elements 122 substantially impede movement of vapours from the surface 119 to the atmosphere. As noted above, not only are the vapours harmful, they also function to dissipate thermal energy into the atmosphere. The net result is that the amount of energy inputs required to maintain the temperature of the mixture at about 80° C. is reduced, because loss of thermal energy is significantly reduced. Also, the volume of vapours released from the mixture into the atmosphere is substantially reduced by the system 120, resulting in less harm to the environment in the vicinity of the container 110.

As described above, in some situations, the well's production rate is so high that the heavy crude oil is removed from the container 110 before the mixture has been heated to 80° C. It has been found that, in these situations, the effect of the system 120 (positioned substantially in the mixture and positioned therein and thereon for substantially covering the surface 119) is sufficiently significant that the mixture is heated to 80° C. in the relatively short time permitted, resulting in significant improvements in subsequent processing of the heavy crude oil.

The system 120 of the invention may also be used in connection with bitumen that has had diluent mixed into it. As is known in the art, bitumen, when mixed with certain diluent, can be pumped. Typically, the diluent is a natural gas liquid, such as, for example, butane, hexane, and heptane. The nature gas liquids may be added at approximately 30 percent by volume, for instance, to result in a mixture of bitumen and diluent that has a viscosity sufficiently low that the bitumen-diluent mixture can be pumped. In practice, the bitumen-diluent mixture is stored in storage or "sales" tanks, which are a buffer between production, and pipelines to a refinery.

However, as is known, the diluent typically is relatively volatile, and tends to vaporize relatively quickly. The diluent is potentially harmful if released to the atmosphere, and it also would assist in dissipating heat to the atmosphere. To prevent the release of the vaporized diluent into the atmosphere, it is typical to have relatively large vapour recovery units (VRUs) mounted on the storage tanks. A large capital cost is incurred when the VRU is constructed, and substantial operating costs are also incurred to operate the VRU.

From the foregoing, however, it can be seen that in this situation, the system 120 preferably is deployed to impede and obstruct the release of vaporized diluent into the atmosphere, and also to impede and obstruct the dissipation of heat into the atmosphere. Accordingly, if the system 120 is used to reduce vaporization, however, a smaller VRU may be constructed (thereby reducing capital costs), and the costs incurred in operating the smaller VRUs would also be less. In one embodiment, it is preferred that the system 120 is used to reduce vaporization of the diluent by substantially covering the surface of the bitumen-diluent mixture.

Figure 8A:
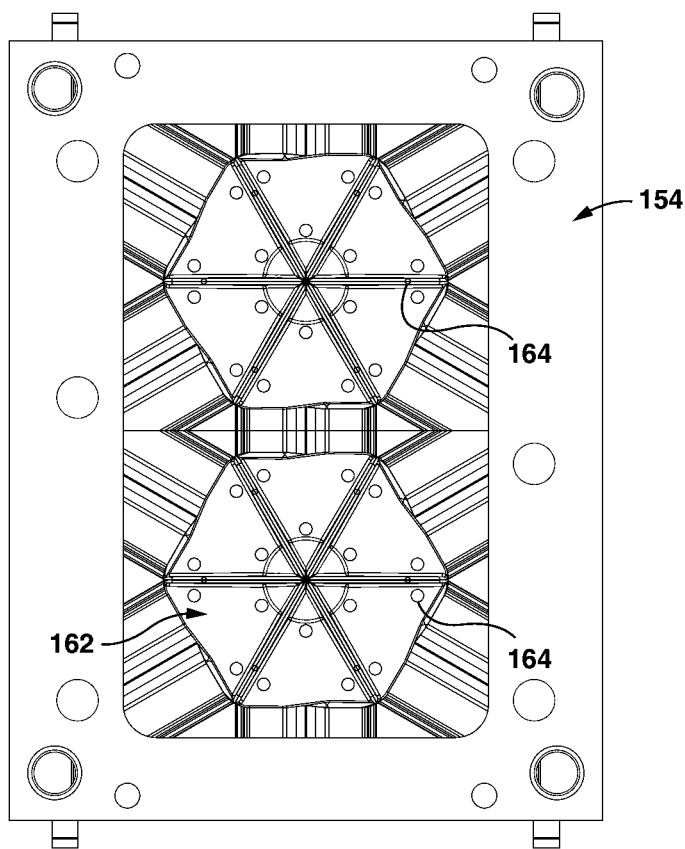
FIG. 8A is a plan view of a first part of an embodiment of a mold assembly of the invention, drawn at a smaller scale.
Figure 8B:
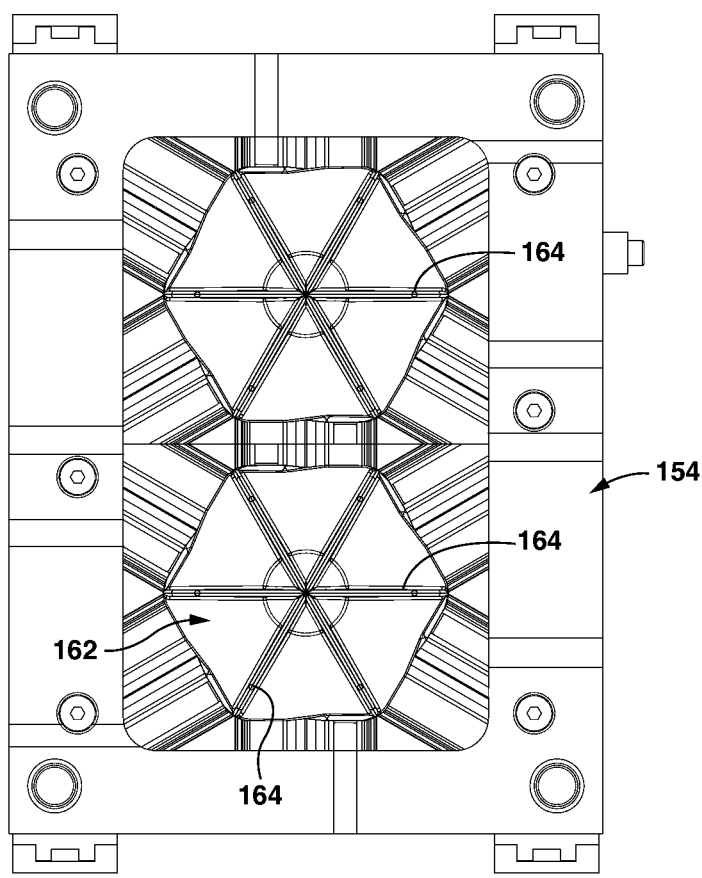
FIG. 8B is a plan view of a second part of the mold assembly of FIG. 8A.
Figure 9:
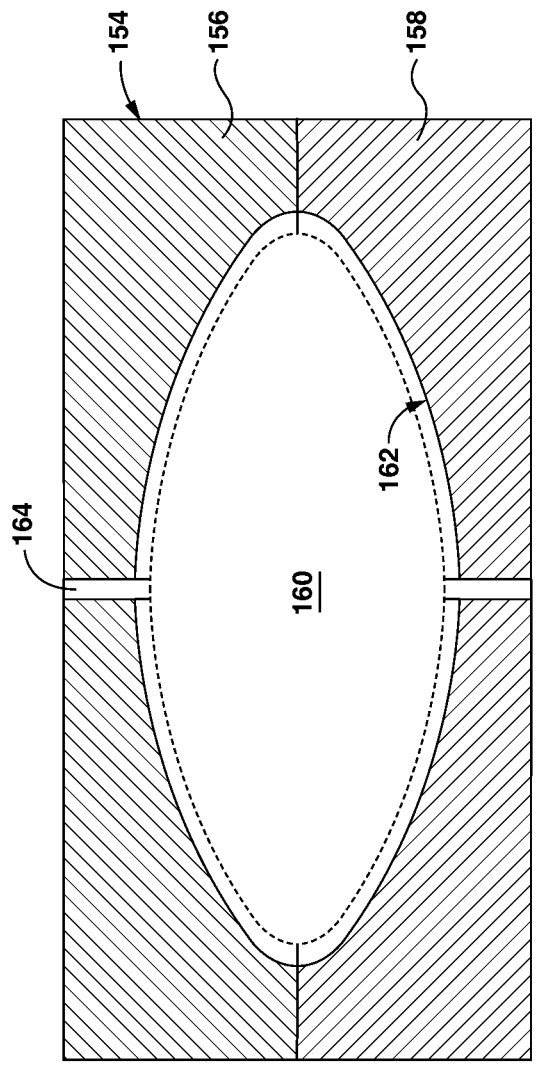
FIG. 9 is a cross-section of the mold assembly of FIG. 8A with the first and second parts positioned to define a mold cavity, drawn at a larger scale.

In order to form the element 122, one or more mold assemblies (i.e., tooling) 154 are used. Preferably, a conventional injection molding machine (not shown) is used to inject the material mixture (as hereinafter defined) into the mold assembly 154. As can be seen in FIGS. 8A and 8B, the mold assembly 154 preferably includes first and second parts 156, 158 that are joined together to define one or more mold cavities 160 therein, as shown in FIG. 9. It will be understood that the first and second parts 156, 158 as illustrated each include one half of a mold 162 defining the mold cavity 160.

Vents 164 are provided, to allow gases released during the injection molding process to escape from the mold cavity 160. However, in order to form the element 122 using the methods of the invention described below, it has been found that certain of the vents 164 preferably are substantially larger than conventional vents. Also, there are larger additional vents provided in the mold assembly 154 of the invention.

For example, for an injection molded part made of a certain type of polyamide resin, 18 vents about 0.0005 inch (approximately 0.0013 cm) deep typically would be utilized. It is preferred that the mold assembly 154 includes the typical 18 vents. However, in addition to the aforesaid 18 vents, the mold assembly 154 may include another 12 vents, each measuring about 0.016 inch (approximately 0.04 cm) deep in the rib areas, and another 12 vents, measuring about 0.006 inch (approximately 0.015 cm) each on the parting line, and on about 0.008 inch (approximately 0.02 cm) deep on the center ball area. The additional, and unusually large, vents serve to regulate varying cavity pressures due to the complex geometry of the element 122 and facilitate the egress of gaseous byproducts generated during the chemical foaming process. For clarity, it will be understood that the vents are generally referred to by the reference numeral 164, regardless of whether the vents are "standard" or typical, or additional, and/or larger than typical vents.

Figure 8C:
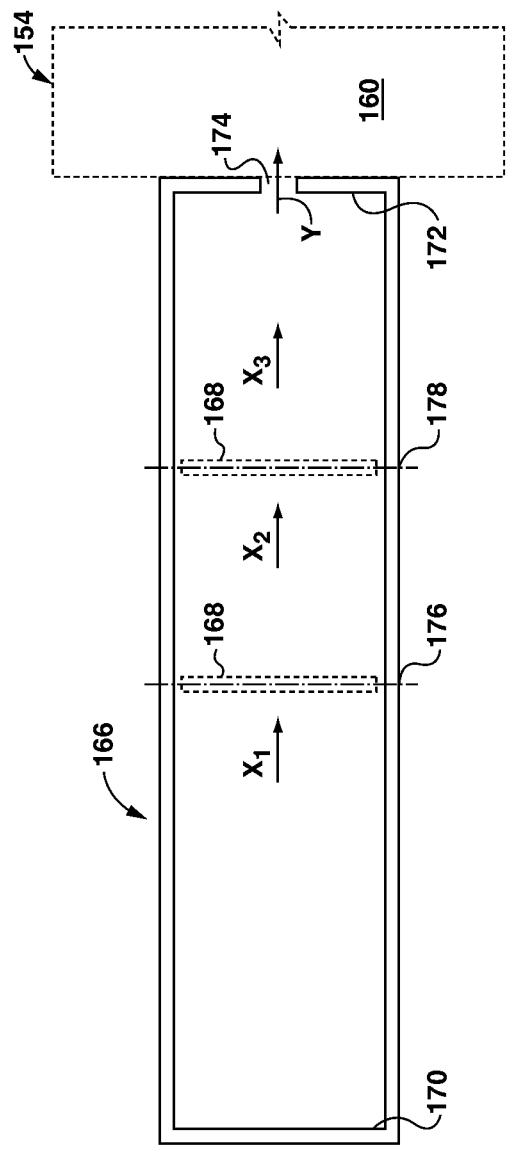
FIG. 8C is a schematic illustration of a barrel of an injection molding machine, and certain components thereof related thereto, drawn at a smaller scale.

Only the mold assembly 154 is shown in FIGS. 8A, 8B, and 9. A barrel 166 of a conventional injection molding machine is schematically illustrated in FIG. 8C, as will be described. It will be understood that the injection molding machine is conventional.

In one embodiment, it is preferred that the element 122 is made of a suitable polyamide polymer resin. It is also preferred that the polyamide resin is a suitable nylon, due to nylon's resistance to degradation when immersed in hydrocarbons. Preferably, the polyamide polymer resin is nylon 6, 12 (referred to herein as "Nylon 612"). This resin is preferred because Nylon 612 tends not to degrade when in contact with the hydrocarbon mixture 112. Those skilled in the art would be aware of other resins that may be suitable for use in the hydrocarbon mixture 112.

Figure 6A:
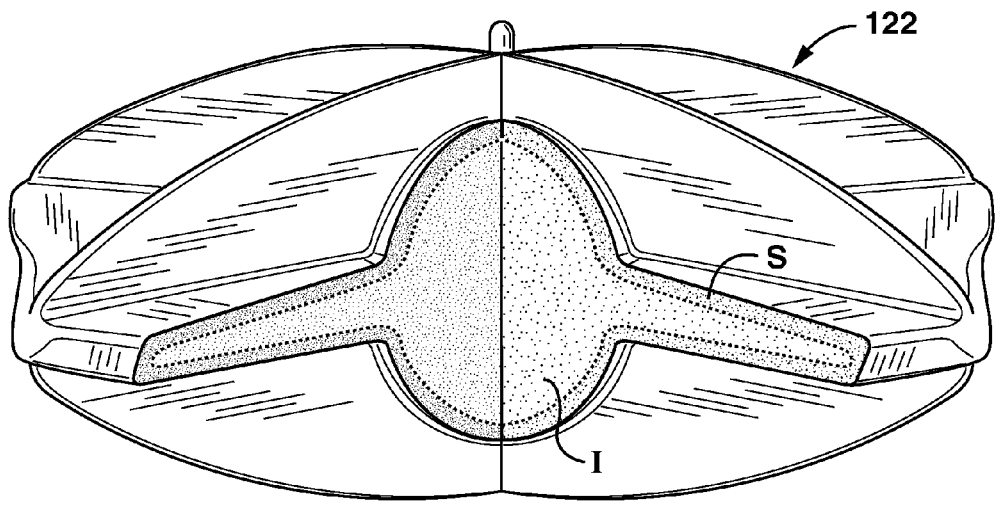
FIG. 6A is an isometric view of the element of FIG. 5 with a portion thereof cut away.
Figure 6B:
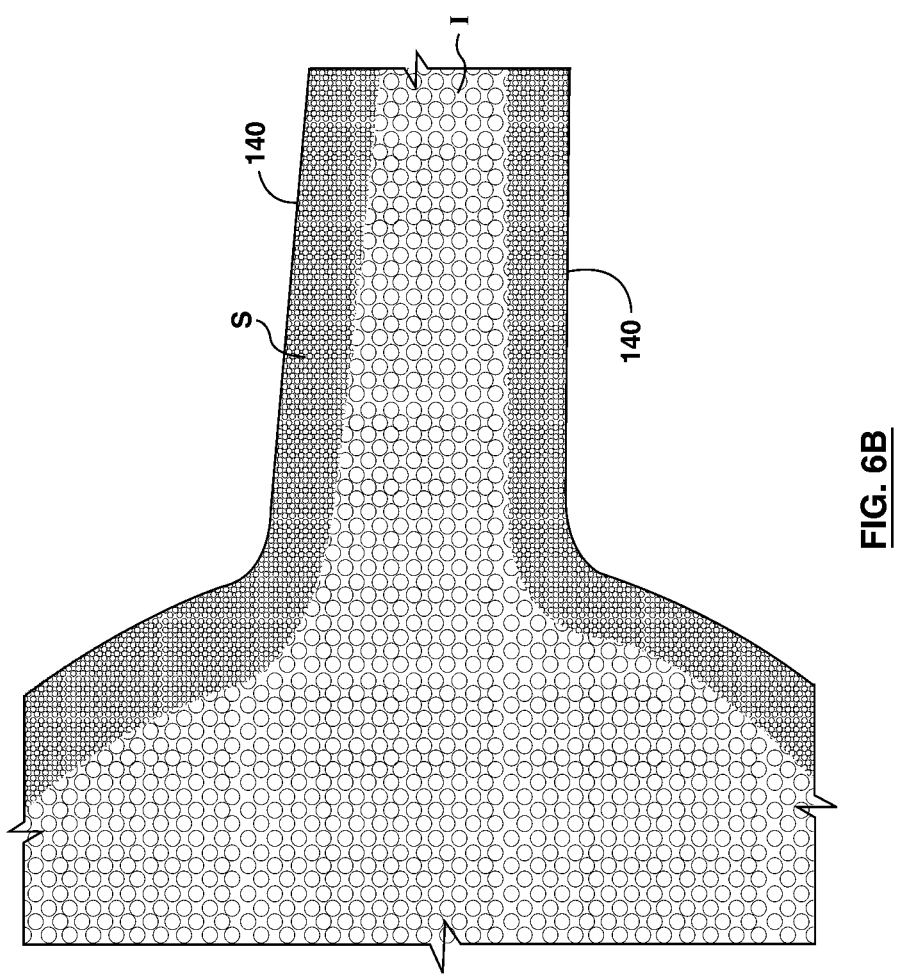
FIG. 6B is a cross-section of another portion of the element of FIGS. 5 and 6A, drawn at a larger scale.

However, because Nylon 612 has a specific gravity of approximately 1.07, and the heavy crude oil may have a specific gravity of approximately 0.92, it is necessary to reduce the density of the Nylon 612 when the element 122 is formed. As will be described, this preferably is achieved by utilizing a foaming agent. The Nylon 612 resin and the foaming agent preferably are mixed together to form a material mixture, that is injected into the mold cavity. Due to the foaming agent and the process of injection molding, the material forming the element 122 preferably is in the form of a matrix of Nylon 612 around a number of voids, or bubbles (FIGS. 6A, 6B).

The Nylon 612 resin has a melt flow (measured according to ASTM D1238) of approximately 15 or 16. It would be appreciated by those skilled in the art that a material with such a high melt flow tends to be relatively easily flowable, and consequently tends to be difficult to foam.

It appears that, when the element 122 is floating in and on the hydrocarbon mixture 112, the heavy crude oil 114 (and possibly water) of the mixture 112 is adsorbed and/or absorbed into the element, over an extended period of time. At present, the mechanism of infiltration of the element by the heavy crude oil 114 is not well understood. For the purposes hereof, "adsorption/absorption" shall be understood to refer to adsorption or absorption or both adsorption and absorption, or combinations thereof.

At this point, it is not known how long the element 122 of the invention may float in and on the mixture 112 in a suitable position relative to the surface (as described herein) before its density becomes too high, due to adsorption/absorption of the heavy crude oil. It is believed that the element 122 may continue to function acceptably, floating in the desired position relative to the surface 119, over an extended period of time.

In order to minimize the adsorption/absorption of the heavy crude oil and other liquids into the element, it is preferred that the element 122 has an internal structure in which a skin region ("S") of fine cells surrounds an interior region ("I") having a coarser cellular structure (FIGS. 6A, 6B). In particular, it is preferred that the element 122 is formed so that a substantially uniform cell structure is provided in each of the skin region "S" and the interior region "I". This structure is thought to provide two barriers to adsorption/absorption of the heavy crude oil. Initially, the heavy crude oil is adsorbed/absorbed into the finer cellular structure of the skin region "S". Those skilled in the art would appreciate that, due to the relatively fine cellular structure, the adsorption/absorption of the heavy crude oil into the skin region "S" is likely to take some time. Next, i.e., after the heavy crude oil is adsorbed/absorbed into the skin region "S", the heavy crude oil permeates into the coarser cells of the interior region "I". If the cellular structure is substantially uniform then there are no relatively large internal openings, and the heavy crude oil is only able to permeate the element 122 one cell or void at a time. In this way, the substantially uniform cellular structure is believed to significantly delay the adsorption/absorption of the heavy crude oil into the element 122.

In use, the elements 122 are deployed in the container 110 either after the mixture 112 has been introduced therein, or before. As described above, a sufficient number of the elements 122 is used that the surface 119 of the mixture 112 is substantially covered by the elements 122. The elements 122 are allowed to position themselves under the influence of gravity so that they engage each other at their respective outer edges 138 across the surface 119, the elements being constrained by engagement with the interior surface 126 of the container wall 128.

Figure 10:
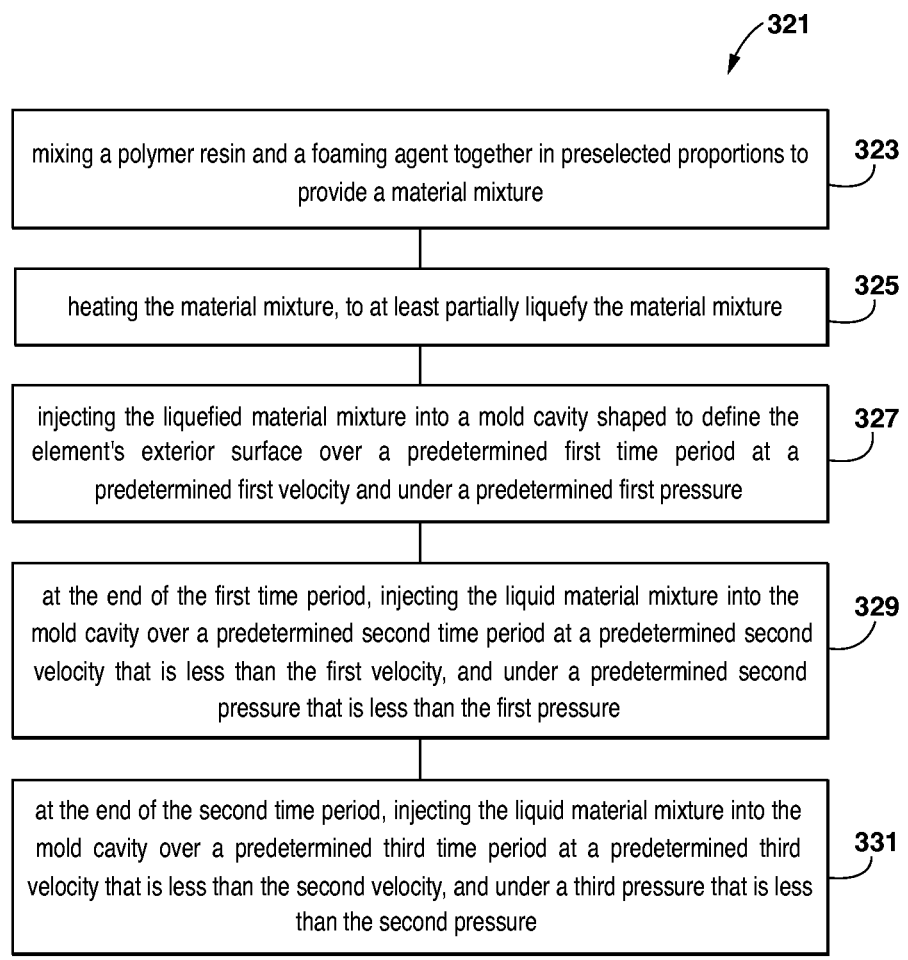
FIG. 10 is a flow chart schematically illustrating an embodiment of a method of the invention.

An embodiment of a method 321 of the invention is schematically illustrated in FIG. 10. The method is for forming one or more elements 122 to float at least partially on the surface 119 of the at least partially liquid hydrocarbon mixture 112. The method 321 preferably begins with mixing a polymer resin and a foaming agent together in preselected proportions to provide a material mixture (FIG. 10, step 323). The material mixture is heated, to at least partially liquefy the material mixture (step 325). Preferably, the at least partially liquefied material mixture is injected into a mold cavity configured to define the element's exterior surface over a predetermined first time period at a predetermined first velocity and under a predetermined first pressure (step 327). At the end of the predetermined first time period, the at least partially liquefied material mixture is injected into the mold cavity over a predetermined second time period at a predetermined second velocity that is less than the first velocity, and under a predetermined second pressure that is less than the first pressure (step 329). At the end of the second time period, the at least partially liquefied material mixture is injected into the mold cavity over a predetermined third time period at a predetermined third velocity that is less than the second velocity, and under a third pressure that is less than the second pressure (step 331).

As described above, it has been determined that polypropylene, HDPE, and PE are not suitable materials for use with the hydrocarbon mixture. It has been determined that a polyamide polymer is suitable. Accordingly, and as noted above, in one embodiment, the polymer resin preferably is a polyamide. Preferably, the polyamide polymer resin is Nylon 612.

The specific gravity of Nylon 612 is approximately 1.07. However, the specific gravity of the heavy crude oil is about 0.92. In order for the element 122 to be positioned as preferred when floating partly in and on the mixture 112, the specific gravity of the element 122 should be approximately 50 percent of the specific gravity of the mixture 112. That is, the element's specific gravity preferably should be approximately 0.46 or less, representing a decrease in density of approximately 57 percent, or more. This large density reduction has been achieved using the method of the invention.

This is a surprising and unusual result, because it is generally understood that a density reduction of 30 percent is the most that can typically be achieved when utilizing standard injection molding equipment.

To practise the invention herein, standard injection molding equipment is used to inject the material mixture, as noted above. Those skilled in the art would appreciate that, in the typical injection molding machine, the heated resin (i.e., the material mixture) is pushed through the barrel 166 by a plunger 168, e.g., driven by a screw or a ram device (not shown). During an injection, the plunger travels from a first end 170 to a second end 172 (FIG. 8C). The second end 172 is in fluid communication with the mold cavity 160 and via a nozzle 174. (It will be understood that the material mixture and many components of the injection molding machine are omitted from FIG. 8C for clarity.)

The plunger 168, in moving from the first end 170 to the second end 172, injects the molten material mixture into the mold cavity 160 via the nozzle 174. When the plunger 168 arrives at the second end 172, the injection is completed, and substantially all the material mixture that was in the barrel 166 has been injected into the mold cavity 160. As described above, in the tooling (i.e., the mold assembly 154) used with the method of the invention, the only unusual features are the larger number of vents, and also the oversized vents.

Those skilled in the art would be aware that, in the prior art, the movement of the plunger from the first end to the second end is considered the first of two stages. In the second stage, the material injected into the mold cavity is "held" for a certain period of time. In the prior art, injection molding only involves these two stages.

In order to achieve the unusually large density reduction referred to above, the method of the invention involves a number of unusual steps and features. For instance, in one embodiment, it is preferred that the foaming agent makes up more than 1 percent by weight of the material mixture by weight, the balance being the polymer resin. It is preferred that the foaming agent comprises approximately 1.3 percent by weight of the material mixture. This is an unusually high concentration of foaming agent, as the maximum typically recommended is 1 percent. In order to ensure accuracy, it is preferred that a continuous loss-in, weigh system (utilizing dual load cells) is used. Those skilled in the art would be aware of suitable weighing and control systems.

As described above, it has been determined that the unusually large decrease in density is achievable when the material mixture is injected into the mold cavity in at least three steps. As noted above, in the first step, the material mixture is injected over the predetermined first time period, at the predetermined first velocity, and under the predetermined first pressure.

Those skilled in the art would be aware that the amount of time required for injection molding of a particular part depends, among other things, on the size (i.e., mass) of the part to be formed. For example, if the element 122 has a mass of approximately 286 grams (approximately 0.63 lbs.), then the total injection time is approximately 4.5 seconds.

Accordingly, it is believed that the predetermined time periods are most appropriately expressed herein in terms of the position of the plunger 168 in the barrel 166 during the process. For instance, in one embodiment, it is preferred that the first predetermined time period terminates when the plunger 168 is approximately at a halfway point (identified by reference numeral 176 in FIG. 8C) along the barrel 166, i.e., approximately halfway between the first and second ends 170, 172 of the barrel 166. In one embodiment, therefore, the first predetermined time period is the time in which the plunger 168 travels in the direction indicated by arrow "$X_1$" in FIG. 8C from the first end 170 of the barrel 166 to the halfway point 176 on the barrel 166, the halfway point 176 being approximately equidistant between the first and second ends 170, 172 of the barrel 166.

At the end of the first step, the second step begins. There is no time delay between the first and second steps. As noted above, the second step involves injecting the material mixture over the predetermined second time period, at the predetermined second velocity, and under the predetermined second pressure. The second predetermined time period is the time in which the plunger 168 travels in the direction indicated by arrow "$X_2$" in FIG. 8C from the halfway point 176 to a location 178 that is approximately equidistant between the halfway point 176 and the second end 172. The second predetermined time period preferably terminates when the plunger reaches the location 178.

It will be understood that only one plunger 168 is located in the barrel 166. The plunger 168 is shown in dashed lines at two locations in FIG. 8C to indicate its movement.

Those skilled in the art would be aware of a suitable maximum velocity of injected material in a conventional injection molding machine. For example, a typical maximum velocity is approximately 240 mm/second (approximately 0.79 feet/second). Also, those skilled in the art would be aware of a suitable maximum pressure to which the injected material may be subjected. For instance, in one embodiment, the predetermined first pressure is approximately 21,000 psi (approximately 0.07 kg-force per square cm).

It is preferred that the second velocity is approximately 50 percent of the first velocity, and the second pressure is approximately 48 percent of the first pressure.

Once the second step is completed, the third step commences. There is no time delay between the second and third steps. The third step involves injecting the material mixture into the mold cavity 160 over the predetermined third time period. In accordance with the foregoing, in one embodiment, the predetermined third time period preferably is the time required for the plunger to move in the direction indicated by arrow "$X_3$" in FIG. 8C from the aforesaid location 178 in the barrel 166 to the second end 172 of the barrel 166. It is also preferred that the third velocity is approximately 50 percent of the second velocity, and the third pressure is approximately 75 percent of the second pressure. From the foregoing, it can be seen that the decreases in the velocity preferably are linear, however, the decreases in pressure preferably are not linear.

It will be understood that the material mixture (not shown in FIG. 8C) is injected into the mold cavity 160 in the mold assembly or tooling 154 via the nozzle 174 in the direction indicated by arrow "Y" in FIG. 8C.

By way of example, when the element 122 has a mass of approximately 286 grams (approximately 0.63 lbs.), in one embodiment, the first predetermined time period preferably is approximately 1.0 second, the second predetermined time period is approximately 1.5 second, and the third predetermined time period is approximately 2.0 seconds. Where the barrel extends 216 mm (approximately 8.5 inches), the halfway point 176 is at approximately 108 mm (approximately 4.25 inches) from the first end, and the location 178 is at approximately 54 mm (approximately 2.1 inches) from the second end 172. Where the element is 286 grams (approximately 0.63 lbs.), it has been found that, by the end of the first predetermined time period, 142 grams (approximately 0.31 lbs.) have been injected; by the end of the second predetermined time period, approximately 212 grams (approximately 0.47 lbs.) in total have been injected; and in the third predetermined time period, another approximately 74 grams (approximately 0.16 lbs.) are injected, i.e., for a total of approximately 286 grams (approximately 0.63 lbs.).

From the foregoing, it can also be seen that the method of the invention does not include a "hold" or "pack" stage that typically is a second stage in a conventional injection molding process, the first stage being injection. It has been found that, in the method of the invention, no hold stage is needed. Instead, the injection proceeds from the first step to the second step, and then from the second step to the third step, without stopping. Accordingly, the method of the invention differs significantly from the prior art method.

It has also been determined that the temperature of the material mixture preferably is about 30° F. (approximately 1.1° C.) lower than the usual temperature for polyamide polymers, e.g., about 470° F. (approximately 243.3° C.) at the nozzle, and otherwise about 450° F. (approximately 232.2° C.). Accordingly, in one embodiment, the temperature of the material mixture during the predetermined first, second, and third time periods is approximately 450° F. (approximately 232.2° C.). Those skilled in the art would appreciate that such a reduction in barrel temperature is unusual. In the method of the invention, however, it has been found to be advantageous so that the melt flow of the resin is reduced to a level that is more conducive to the foaming process.

It is also preferred that a mechanical shut-off tip serves as the gateway from the barrel of the injection molding machine to the injection mold assembly 154. The shut-off tip prevents pressure from the barrel of the machine from "choking" off the expansion in the mold cavity.

It has been found that, utilizing the method of the invention, the element 122 formed according thereto preferably has a specific gravity of between approximately 0.42 and approximately 0.49. Preferably, the specific gravity of the element 122 formed according to the method of the invention is 0.46 or less.

As described above, the very large reduction in density of the polyamide polymer resin is achieved by adopting an unusual process. In addition, the element 122 formed using the method of the invention has a substantially uniform cellular structure internally, which is advantageous for the reasons set out above. An unexpected benefit of employing the method of the invention is that it results in the elements 122 having unusually good anti-static characteristics. The reasons for this phenomenon are not well understood at this time. However, it is an important benefit, because it means that no additives or treatments are needed in order for the elements 122 to have the desired anti-static surface characteristics.

It would be appreciated by those skilled in the art that, for safety, the element preferably has anti-static characteristics, i.e., its surface preferably is somewhat conductive, to discourage a build-up of an electrostatic charge thereon. In one embodiment, the element 122 formed according to the method of the invention has a surface resistivity less than approximately $1 \times 10^{12}$ Ohms. In another embodiment, the element 122 preferably has a surface resistivity of approximately $9.03 \times 10^{10}$ Ohms. Because a surface resistivity less than $1 \times 10^{12}$ Ohms is considered to provide good anti-static characteristics, the element 122 is believed to have relatively good anti-static characteristics.

It has been found that, in the absence of the elements 122, the mixture (i.e., the heavy crude oil) has sufficient conductivity that static electricity is generally not an issue in the collection tank. The conductivity of the mixture and/or the heavy crude oil is generally due to the presence of water ions, dissolved salts, and heavy metals therein. However, when the elements 122 are initially introduced into the container or collection tank 110, they may have static electricity charges accumulated thereon. (At that point, the elements are not covered by the mixture and/or crude oil.) Upon introduction of the elements into the container, therefore, static electricity may otherwise be potentially dangerous (i.e., if the elements did not have good anti-static characteristics), as the static electricity charge could discharge and ignite petroleum fumes or crude oil inside the headspace "H" of the container. It is believed that there is less risk of static electricity build-up once the elements 122 become at least partially covered by the mixture and/or the heavy crude oil, and their anti-static properties become less important, because the mixture and/or the heavy crude oil is relatively conductive.

It is also preferred that the system 120 includes a number of the elements 122 formed according to the method of the invention. Preferably, the elements 122 are engaged with each other (i.e., at the central plates of each), as described above, to substantially cover the surface 119 of the mixture 112, for impeding transfer of thermal energy and also for impeding the emission of vapours from the mixture 112 via the surface 119. For example, and as can be seen in FIGS. 2B and 2C, the elements 122 preferably are positioned in the mixture 112 so that the central plate 134 is above the surface 119, and the outer edges 138 of the elements 122 preferably are engaged with each other across the surface 119 so that the transfer of thermal energy from the mixture to the atmosphere via the surface 119 is impeded or hindered. Also, the system 120 impedes or hinders the release of vapours from the mixture into the atmosphere via the surface 119. It will be understood that the transfer of thermal energy from the mixture to the atmosphere, and the release of vapours from the mixture to the atmosphere, are not completely stopped by the system.

Figure 11:
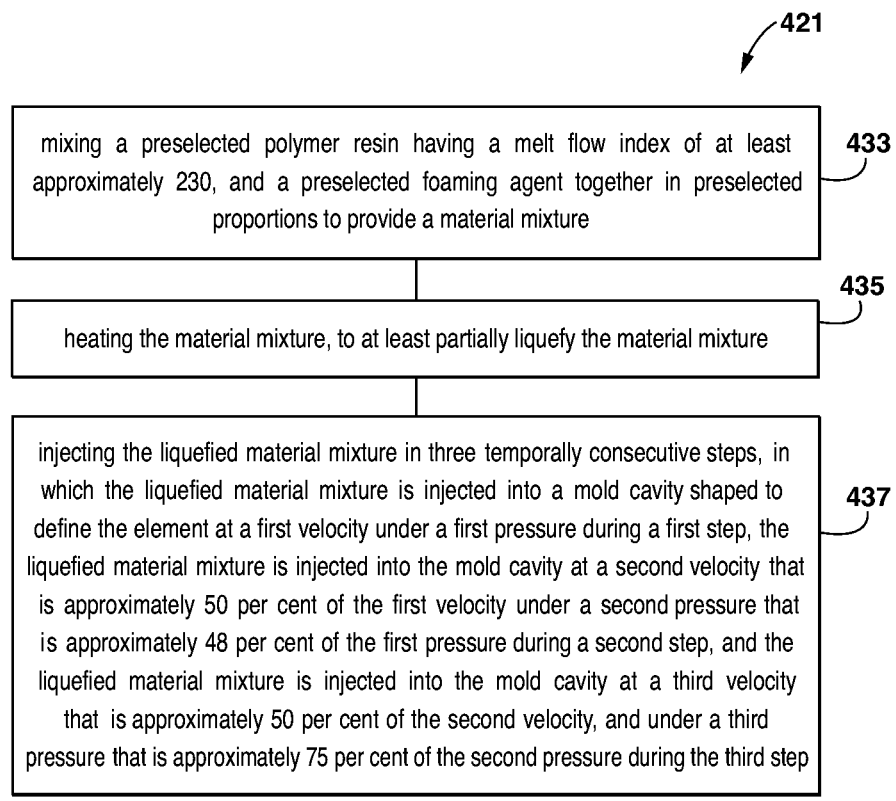
FIG. 11 is a flow chart schematically illustrating another embodiment of a method of the invention.

Another embodiment of the method 421 of the invention is schematically illustrated in FIG. 11. The method 421 is for forming one or more elements 122, to float at least partially on the surface 119 of the at least partially liquid hydrocarbon mixture 112. Preferably, the method includes, first, mixing a preselected polymer resin having a melt flow index of at least approximately 15, and a preselected foaming agent together in preselected proportions to provide the material mixture (FIG. 11, step 433). Preferably, the material mixture is heated, to at least partially liquefy the material mixture (step 435). The at least partially liquefied material mixture is injected in three temporally consecutive steps, in which the at least partially liquefied material mixture is injected into a mold cavity configured to define the element at a first velocity under a first pressure during a first step, the at least partially liquefied material mixture is injected into the mold cavity at a second velocity that is approximately 50 percent of the first velocity under a second pressure that is approximately 48 percent of the first pressure during a second step, and the at least partially liquefied material mixture is injected into the mold cavity at a third velocity that is approximately 50 percent of the second velocity, and under a third pressure that is approximately 75 percent of the second pressure during the third step (step 437).

It will be understood that, in the foregoing method 421, it is preferred that the foaming agent makes up more than 1 percent of the material mixture by weight, the balance being the polyamide polymer resin. It will also be understood that the polyamide polymer resin preferably is Nylon 612.

The temperatures of the material mixture in the method 421 are the same as the corresponding temperatures described above in connection with the method 321. Also, it will be understood that the duration of each of the first, second, and third steps preferably is determined according to the position of the plunger in the barrel during injection, as described above.

Figure 12:
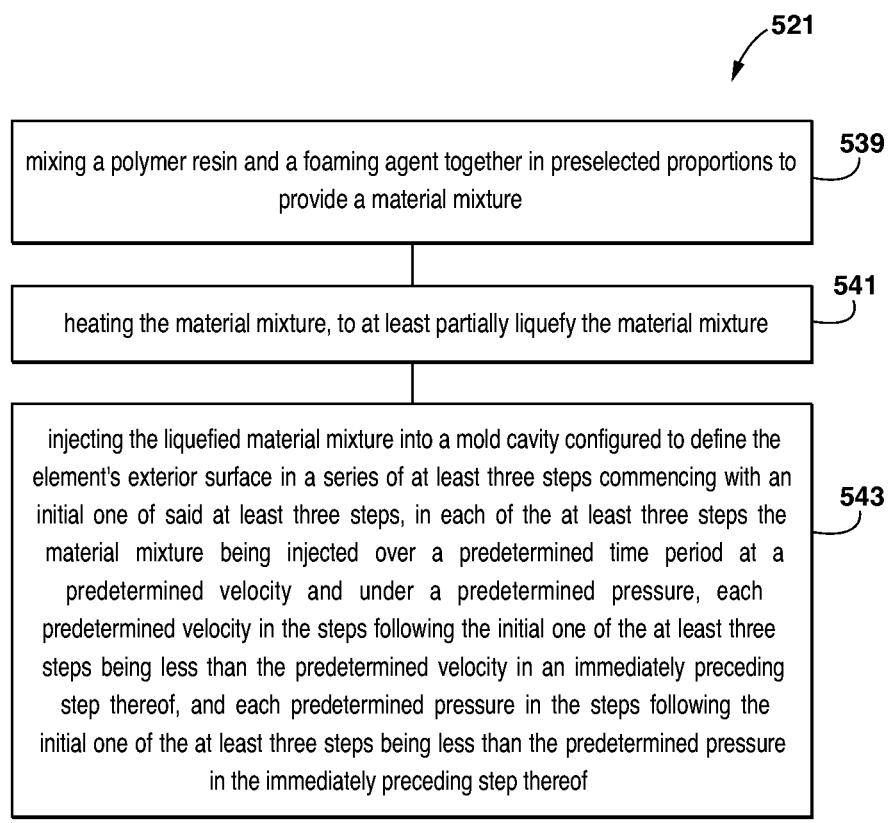
FIG. 12 is a flow chart schematically illustrating an alternative embodiment of a method of the invention.

Another embodiment of the method 521 of the invention is schematically illustrated in FIG. 12. The method 521 is for forming one or more elements 122. Preferably, the method includes, first, mixing a polymer resin and a foaming agent together in preselected proportions to provide a material mixture (FIG. 12, step 539). The material mixture is heated, to at least partially liquefy the material mixture (step 541). The at least partially liquefied material mixture is injected into the mold cavity configured to define the element's exterior surface in a series of at least three steps commencing with an initial one of the at least three steps. In each of the at least three steps, the material mixture is injected into the mold cavity over a predetermined time period at a predetermined velocity and under a predetermined pressure. Each predetermined velocity, in the steps following the initial one of the at least three steps, is less than the predetermined velocity in an immediately preceding step thereof. Also, each predetermined pressure, in the steps following the initial one of the at least three steps, is less than the predetermined pressure in the immediately preceding step thereof (step 543). Those skilled in the art would appreciate that, depending on the circumstances, additional steps (i.e., more than three) may be utilized, depending on the results that are sought to be achieved and a number of other variables, including the desired specific gravity of the element formed using the method.

As noted above, the method of the invention achieves surprising results, in view of the prior art. The method does not include a "hold" or "pack" stage, typically included in known injection molding methods. The density of the polymer resin is reduced by approximately 60 percent, which far exceeds density reductions that can typically be achieved. Also, the element formed in the method of the invention has a surprisingly low surface resistivity, so that its anti-static characteristics are relatively good. The elements 122 produced according to the method of the invention may be positioned in the container 110 to form the system 120, in which the elements 122 engage each other to substantially cover the entire surface 119, to impede transfer of thermal energy from the mixture 112 via the surface 119, and to impede release of vapours from the mixture via the surface 119.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A method of forming at least one element to float at least partially on a surface of an at least partially liquid hydrocarbon mixture, the method comprising:
    (a) mixing a polymer resin and a foaming agent together in preselected proportions to provide a material mixture;
    (b) heating the material mixture, to at least partially liquefy the material mixture;
    (c) injecting the at least partially liquefied material mixture into a mold cavity configured to define said at least one element's exterior surface over a predetermined first time period at a predetermined first velocity and under a predetermined first pressure;
    (d) at the end of the first predetermined time period, injecting the at least partially liquefied material mixture into the mold cavity over a predetermined second time period at a predetermined second velocity that is less than the first velocity, and under a predetermined second pressure that is less than the first pressure; and
    (e) at the end of the second predetermined time period, injecting the at least partially liquefied material mixture into the mold cavity over a predetermined third time period at a predetermined third velocity that is less than the second velocity, and under a third pressure that is less than the second pressure.

2. A method according to claim 1 in which the polymer resin is a polyamide.

3. A method according to claim 2 in which the polyamide polymer resin is Nylon 612.

4. A method according to claim 1 in which the foaming agent comprises more than 1 percent of the material mixture by weight, the balance being the polymer resin.

5. A method according to claim 1 in which the second velocity is approximately 50 percent of the first velocity, and the second pressure is approximately 48 percent of the first pressure.

6. A method according to claim 5 in which the third velocity is approximately 50 percent of the second velocity, and the third pressure is approximately 75 percent of the second pressure.

7. A method according to claim 2 in which the temperature of the material mixture during the predetermined first, second, and third time periods is approximately 450° F. (approximately 232.2° C.).

8. An element formed according to the method of claim 1 having a specific gravity of between approximately 0.42 and approximately 0.49.

9. An element formed according to the method of claim 1 having a surface resistivity less than approximately $1 \times 10^{12}$ Ohms.

10. An element formed according to claim 1 having a surface resistivity of approximately $9.03 \times 10^{10}$ Ohms.

11. A system comprising a plurality of the elements according to claim 8 in which the elements are engaged with each other to substantially cover the surface of the mixture, for impeding transfer of thermal energy and emission of vapours from the mixture via the surface.

12. A method of forming at least one element to float at least partially on a surface of an at least partially liquid hydrocarbon mixture, the method comprising:
    (a) mixing a preselected polymer resin having a melt flow index of at least approximately 15, and a preselected foaming agent together in preselected proportions to provide a material mixture;
    (b) heating the material mixture, to at least partially liquefy the material mixture;
    (c) injecting the at least partially liquefied material mixture in three temporally consecutive steps, in which the at least partially liquefied material mixture is injected into a mold cavity configured to define said at least one element at a first velocity under a first pressure during a first step, the at least partially liquefied material mixture is injected into the mold cavity at a second velocity that is approximately 50 percent of the first velocity under a second pressure that is approximately 48 percent of the first pressure during a second step, and the at least partially liquefied material mixture is injected into the mold cavity at a third velocity that is approximately 50 percent of the second velocity, and under a third pressure that is approximately 75 percent of the second pressure during a third step.

13. A method according to claim 12 in which the foaming agent comprises more than 1 percent of the material mixture by weight, the balance being the polyamide polymer resin.

14. A method according to claim 12 in which the polyamide polymer resin is Nylon 612.

15. A method according to claim 14 in which the temperature of the material mixture during the predetermined first, second, and third time periods is approximately 450° F. (approximately 232.2° C.).

16. An element formed according to the method of claim 12 having a specific gravity of between approximately 0.42 and approximately 0.49.

17. An element formed according to the method of claim 12 having a surface resistivity less than approximately $1 \times 10^{12}$ Ohms.

18. An element formed according to claim 12 having a surface resistivity of approximately $9.03 \times 10^{10}$ Ohms.

19. A system comprising a plurality of the elements according to claim 16 in which the elements are engaged with each other to substantially cover the surface of the mixture, for impeding transfer of thermal energy and emission of vapours from the mixture via the surface.

20. A method of forming at least one element to float at least partially on a surface of an at least partially liquid hydrocarbon mixture, the method comprising:

(a) mixing a polymer resin and a foaming agent together in preselected proportions to provide a material mixture;

(b) heating the material mixture, to at least partially liquefy the material mixture; and (c) injecting the at least partially liquefied material mixture into a mold cavity configured to define said at least one element's exterior surface in a series of at least three steps commencing with an initial one of said at least three steps, in each of said at least three steps the material mixture being injected over a predetermined time period at a predetermined velocity and under a predetermined pressure, each said predetermined velocity in the steps following the initial one of said at least three steps being less than said predetermined velocity in an immediately preceding step thereof, and each said predetermined pressure in the steps following the initial one of said at least three steps being less than said predetermined pressure in the immediately preceding step thereof.

\* \* \* \* \*